United States Patent
Liao et al.

(10) Patent No.: US 10,297,829 B2
(45) Date of Patent: May 21, 2019

(54) POLYANTHRAQUINONE-BASED ORGANIC CATHODE FOR HIGH-PERFORMANCE RECHARGEABLE MAGNESIUM-ION BATTERIES

(71) Applicant: UCHICAGO ARGONNE, LLC, Chicago, IL (US)

(72) Inventors: Chen Liao, Willowbrook, IL (US); Baofei Pan, Woodridge, IL (US); Anthony Burrell, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 219 days.

(21) Appl. No.: 15/246,058

(22) Filed: Aug. 24, 2016

(65) Prior Publication Data

US 2018/0062176 A1   Mar. 1, 2018

(51) Int. Cl.
*H01M 4/60*      (2006.01)
*H01M 4/62*      (2006.01)
*H01M 10/054*    (2010.01)
*H01M 10/056*    (2010.01)
*H01M 10/0561*   (2010.01)

(52) U.S. Cl.
CPC .......... *H01M 4/606* (2013.01); *H01M 4/604* (2013.01); *H01M 4/623* (2013.01); *H01M 4/625* (2013.01); *H01M 10/054* (2013.01); *H01M 10/056* (2013.01); *H01M 10/0561* (2013.01); *H01M 2300/0025* (2013.01)

(58) Field of Classification Search
None
See application file for complete search history.

(56) References Cited

U.S. PATENT DOCUMENTS

| | | |
|---|---|---|
| 2012/0056590 A1 | 3/2012 | Amiruddin et al. |
| 2012/0328936 A1 | 12/2012 | Wessells et al. |
| 2014/0212753 A1* | 7/2014 | Huang ............... H01M 4/5825 |
| | | 429/213 |

FOREIGN PATENT DOCUMENTS

CN    103137946 B    8/2015

OTHER PUBLICATIONS

Aurbach, D. et al., Prototype Systems For Rechargeable Magnesium Batteries, Nature 407, 724-727 (2000).
Bitenc, J. et al., Anthraquinone-Based Polymer As Cathode In Rechargeable Magnesium Batteries, ChemSusChem 8, 4128-4132 (2015).

(Continued)

*Primary Examiner* — Lucas J. O'Donnell
(74) *Attorney, Agent, or Firm* — Olson & Cepuritis, Ltd.

(57) ABSTRACT

A rechargeable magnesium ion electrochemical cell comprising an anode, a cathode, and a non-aqueous magnesium electrolyte disposed between the anode and the cathode is described herein. The cathode comprises a redox-active anthraquinone-based polymer comprising one or more of 1,4-polyanthraquinone or 2,6-polyanthraquinone. Both 2,6-polyanthraquinone and 1,4-polyanthraquinone can operate with 1.5-2.0 V with above 100 mAh/g capacities at a reasonable rate, higher than the state-of-the-art Mg—$Mg_6S_8$ battery. More than 1000 cycles with very small capacity loss can be realized.

19 Claims, 6 Drawing Sheets

(56) References Cited

OTHER PUBLICATIONS

Liao, C. et al., The Unexpected Discovery of the Mg(HMDS)2/MgCl2 Complex As A Magnesium Electrolyte For Rechargeable Magnesium Batteries, Journal of Materials Chemistry A 3, 6082-6087 (2015).

Pan, B. et al., Polyanthraquinone-Based Organic Cathode For High-Performance Rechargeable Magnesium-Ion Batteries, Advanced Energy Materials 1600140, 1-6 (2016).

Song, Z. et al., Polyanthraquinone As A Reliable Organic Electrode For Stable and Fast Lithium Storage, Communication 54 (47), 13947-13951 (2015).

Zhou, Y. et al., Polyanthraquinone-Based Nanostructured Electrode Material Capable of High-Performance Pseudocapacitive Energy Storage in Aprotic Electrolyte, Nano Energy 15, 654-661 (2015).

* cited by examiner

POLYANTHRAQUINONE-BASED ORGANIC CATHODE FOR HIGH-PERFORMANCE RECHARGEABLE MAGNESIUM-ION BATTERIES

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to materials for use in cathodes of energy storage devices, notably magnesium ion electrochemical cells and batteries. More particularly, the invention relates to magnesium ion cells and batteries in which the cathode of the cell comprises a conductive anthraquinone polymer.

BACKGROUND

Rechargeable batteries are increasingly used for a variety of energy storage applications. While, lithium ion (Li-ion) batteries remain a very important commercial and research focus, there is an increasing need for new battery technologies to provide better cycling and less capacity loss than the Li-ion.

With regard to the growing environmental crisis resulting from rapid worldwide energy consumption, energy harvested from sustainable renewable sources like solar, wind, or tide is desirable. However, the lack of efficient and economical energy storage devices is still a bottle neck for the practical application of these clean energies. Albeit the great success of lithium-ion batteries (LIBs) in the field of portable electronic applications, the cost and safety barriers make the state-of-the-art LIBs not suitable for large power storage or transmission.

One promising approach to an alternative to Li-ion batteries is a battery based on a multivalent ion electrolyte, such as magnesium (Mg) or calcium (Ca). Li-ion, with a charge of +1, can provide only a single electron for an electrical current, whereas multivalent ions (e.g., with a charge of +2 or +3) have the potential to provide two or more the electrical current of Li-ions (depending on the charge of the multivalent ion) if present with the same density. Calcium ion and magnesium ion provide relatively high potentials ($Ca^{2+}$: −2.87 relative to standard hydrogen electrode, SHE; $Mg^{2+}$: −2.37 vs. SHE) suitable for many secondary battery requirements. One of the most relevant aspects is understanding the mechanism of reversible cycling of Mg during battery operation and recharging. So far, reversible Mg plating has been achieved with only a narrow class of electrolytes, inorganic or organic magnesium aluminum chloride salts dissolved in ethereal solutions. For example, the Mg analogues to the most common commercial Li-ion electrolytes instantaneously decompose and passivate the Mg metal anode surface preventing further electrochemical reaction, consequently blocking the battery.

Interest in advanced secondary magnesium ion batteries blossomed with the introduction of the Mg—$Mo_6S_8$ battery. In recent years, in contrast to the rapid progress of effective electrolytes capable of plating/stripping magnesium reversibly with wide electrochemical windows, the development of efficient cathode material is far behind. Materials such as $MnO_2$, $V_2O_5$, and even novel layered oxyfluoride have been reported to facilitate $Mg^{2+}$ ion intercalation, however, they also have problems such as irreversible intercalation and low capacity. To date, Chevrel phase $Mo_6S_8$ is still the most reliable cathode material with long-term cycling performance in rechargeable magnesium ion batteries. However, $Mo_6S_8$ only has a theoretical capacity of around 130 mAh/g, and can only operate at less than 1.3 V (vs Mg), which is not desirable for high density energy storage. Thus, the pursuit of higher voltage and higher capacity cathode material deserves great attention for magnesium ion batteries nowadays. Unfortunately, the traditional transition metal oxide-based cathode materials for lithium ion batteries show intercalation difficulty of the divalent and high charge density $Mg^{2+}$ ions. Redox active organic material is another type of promising alternative for magnesium ion batteries, especially in terms of the resource sustainability and environmental friendliness. Surprisingly, although great success has been achieved for organic cathodes in lithium and sodium ion batteries, only a handful of organic cathodes have been reported for magnesium ion batteries in the literature. A common issue for the organic cathodes is that either they can only deliver low capacity even at very slow current rates, or they suffer from considerable capacity loss upon cycling.

here are ongoing needs for new conductive polymers for multivalent ion batteries, particularly Mg-ion batteries, and for improved methods of preparing such polymers. The polymers and methods described herein address these needs.

SUMMARY

A rechargeable magnesium ion electrochemical cell described herein comprises an anode, a cathode, and an magnesium-containing non-aqueous electrolyte disposed between the anode and the cathode, wherein the cathode comprises a mixture of a redox-active polyanthraquinone polymer and a carbon material in a binding matrix. The polyanthraquinone polymer comprises 2,6-polyanthraquinone (26PAQ), 1,4-polyanthraquinone (14PAQ) or a combination thereof, and provides high performance cathode materials for rechargeable magnesium ion batteries, e.g., in comparison to 1,5-poly(anthraquinonylsulfide) (PAQS).

Mg-PAQS batteries have been evaluated using several non-nucleophilic magnesium electrolytes, such as MACC ($MgCl_2$—$AlCl_3$), MHCC ($Mg(HMDS)_2$-$AlCl_3$) and MTCC ($Mg(TFSI)_2$-$MgCl_2$) (see Bitenc et al. *Chemsuschem* 2015, 8, 4128-4132). Similarly to the previously reported Mg-organic systems, considerable capacity loss was observed in the Mg-PAQS cells upon cycling, and only less than 50 mAh/g capacity could be recovered in 100 cycles (more than 70% capacity loss). The electrode dissolution was believed to be the major issue accounting for this situation. As disclosed herein, redox-active anthraquinone-based polymers comprising 1,4-polyanthraquinone and 2,6-polyanthraquinone are efficient cathodes for rechargeable Mg-ion batteries. Both 2,6-polyanthraquinone and 1,4-polyanthraquinone can operate with 1.5-2.0 V with above 100 mAh/g capacities at a reasonable rate, higher than the state-of-the-art Mg—$Mg_6S_8$ battery. More than 1000 cycles with very small capacity loss can be realized.

For comparison, PAQS was evaluated as a cathode material for magnesium ion batteries using non-nucleophilic electrolytes. The presence of carbonyl groups in the anthraquinonyl moieties prevents the use of any nucleophilic magnesium electrolytes, such as the well-known Grignard-based APC (PhMgCl—$AlCl_3$) or DCC ($nBu_2Mg$+$EtAlCl_2$) electrolytes. Thus, the non-nucleophilic electrolytes, such as 0.3 M Mg(HMDS)$_2$-4(MgCl$_2$ (HMDS=hexamethyldisilazide) in THF solution were chosen to evaluate the polyanthraquinone cathode materials. A similar capacity decay phenomenon was observed in the Mg-PAQS batteries when Mg(HMDS)$_2$-4MgCl$_2$/THF was used as the electrolyte. As shown in FIG. 1, although good electrochemical reversibility can be observed in the cyclic voltammetry measurement, the capacity continues to decay, and eventually only around 30 mAh/g discharge capacity was retained after 100$^{th}$ cycle (70% capacity loss). The fast capacity decay rate indicates that PAQS is not capable of providing sustainable and long-term cycling performance.

One of the merits of organic electrodes is the structure flexibility, which allows for the feasible functionalization to suppress the electrode dissolution. The major issue with the PAQS system arises from the dissolution of the anthraquinone polymer. The 2,6-polyanthraquinone and 1,4-polyanthraquinone polymers did not suffer from this problem.

In some embodiments, the rechargeable magnesium ion electrochemical cell comprises an anode, a cathode, and a magnesium ion-containing electrolyte disposed between the anode and the cathode; wherein the cathode comprises a redox-active anthraquinone polymer; wherein anthraquinone units of the polymer are linked by bonds at the 1 and 4 positions of the anthraquinone units or at the 2 and 6 positions of the anthraquinone units. For example the polymer can comprise one or more of 1,4-polyanthraquinone or 2,6-polyanthraquinone.

The cathode of the electrochemical cell can further comprise other materials such as a particulate carbon material (e.g., carbon black) in addition to the anthraquinone polymer. Preferably, the polymer and carbon are bound together by a binder such as poly(vinylidene difluoride). Preferably, the cathode also further comprises a conductive substrate, such as a metal sheet or foil, a graphite sheet or foil, and the like, in contact with the anthraquinone polymer.

The electrolyte preferably comprises a non-nucleophilic magnesium salt (e.g., Mg(HMDS)$_2$-4MgCl$_2$) in a non-aqueous solvent (e.g., tetrahydrofuran).

Certain cathodes described herein can maintains at least 80% discharge capacity after 100 cycles at a current rate of about 0.5 C (130 mA/g) or at least 90% discharge capacity after 1000 cycles at a current rate of about 1 C (260 mA/g).

Also described herein is a cathode for a rechargeable magnesium ion electrochemical cell comprising a mixture of a redox-active anthraquinone polymer and a particulate carbon material, held together by a binder, and coated on a conductive substrate (e.g., a metal or graphite foil or sheet), wherein the anthraquinone polymer comprises one or more of 1,4-polyanhtraquinone, 2,6-polyanthraquinone. The binder can comprise, e.g., poly(vinylidene difluoride). The particulate carbon material can be any particulate carbon material. In some embodiments the particulate carbon material comprises carbon black. In some embodiments, the polymer carbon and binder are present in a weight ratio of about 4:5:1, respectively

DETAILED DESCRIPTION

Figure 1:
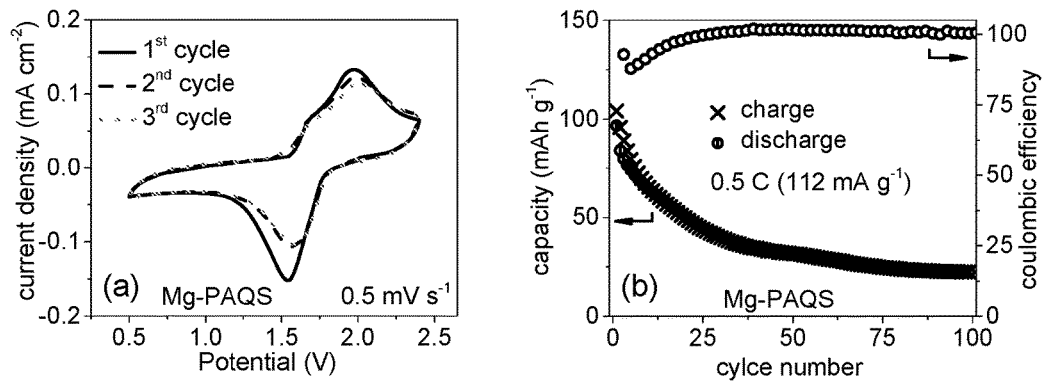
FIG. 1 shows the electrochemical cycling performance of Mg-PAQS cells using 0.3 M Mg(HMDS)$_2$-4MgCl$_2$ in THF (a) steady state cyclic voltammetry at a scan rate of 0.5 mV/s; (b) capacities and coulombic efficiency at a current rate of 0.5 C (112 mA/g).
Figure 2:
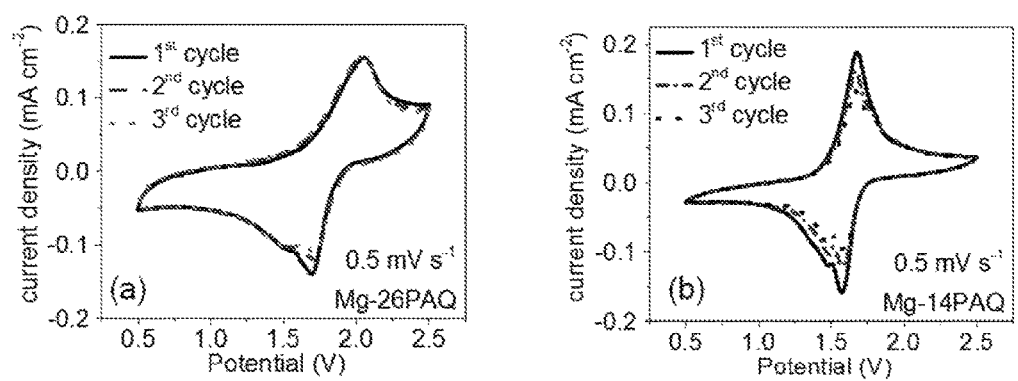
FIG. 2 shows typical steady-state cyclic voltammetry using 0.3 M Mg(HMDS)$_2$-4MgCl$_2$/THF as the electrolyte (0.5 mV/s): (a) Mg-26PAQ cell; (b) Mg-14PAQ cell

Two anthraquinone-based polymers, 26PAQ and 14PAQ, provide improved capacity retention for advanced magnesium ion batteries. As shown in FIG. 2, the two polymers have shown excellent electrochemical reversibility in the cyclic voltammogram measurements using the 0.3 M Mg(HMDS)$_2$-4MgCl$_2$/THF electrolyte. For 26PAQ, two reduction phases were observed at around 1.71 V and 1.52 V (vs Mg/Mg$^{2+}$ and the same reference was used hereafter) respectively, corresponding to the stepwise two electron reduction processes from neutral 26PAQ to [26PAQ]$^{2-}$ anions. Only one broad subsequent oxidation phase was detected in CV at about 2.0 V, making the two redox couplings of 26 PAQ at about 1.85 V and 1.75 V. Similarly, two reduction peaks were also observed for 14PAQ at 1.57 V and 1.48 V, and the two subsequent oxidations took place at 1.67 V and 1.79 V, respectively. Thus, the stepwise two-electron redox potentials of 14PAQ were experimentally measured at about 1.6 V and 1.7 V, which are slightly lower than that of 26PAQ.

Figure 3:
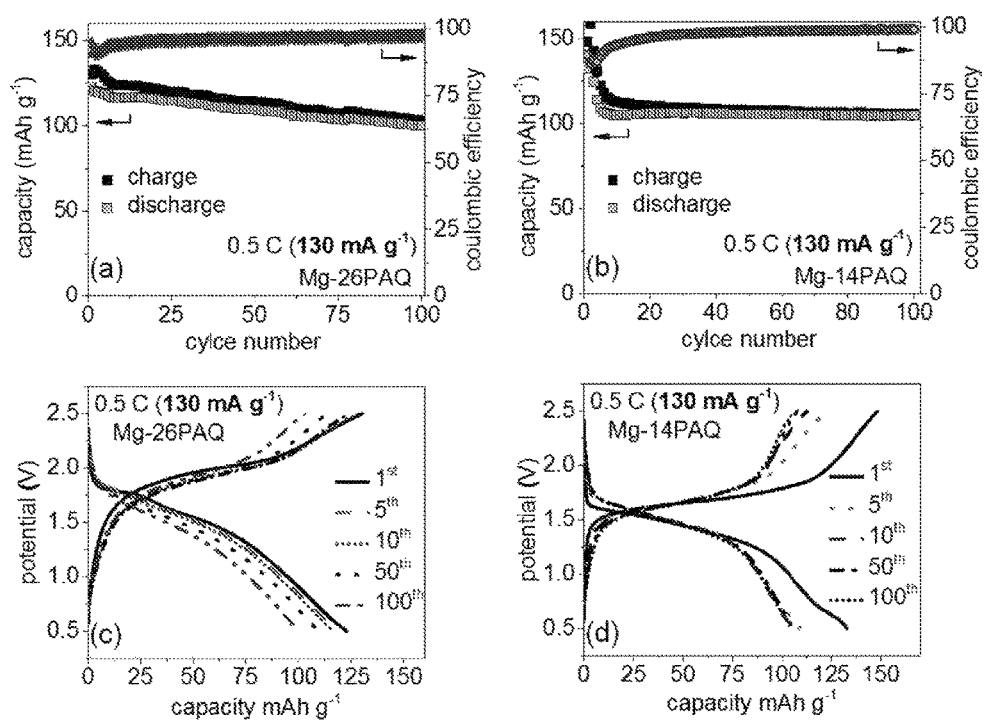
FIG. 3 shows (a) Mg-26PAQ: capacities and coulombic efficiency profiles at the current rate of 0.5 C (130 mA/g); (b) Mg-14PAQ: capacities and coulombic efficiency profiles at the current rate of 0.5 C (130 mA/g); (c) Mg-26PAQ, representative discharge-charge galvanostatic curves; (d) Mg-14PAQ, representative discharge-charge galvanostatic curves.

Having established the excellent electrochemical reversibility of 26PAQ and 14PAQ in the 0.3 M Mg(HMDS)$_2$-4MgCl$_2$/THF electrolyte, their coupling performance was then investigated in magnesium ion batteries. As shown in FIG. 3, Panels (a) and (c), at a moderate current rate of 0.5 C (130 mA/g), 26PAQ cell initially delivered 122 mAh/g discharge capacity, which is slightly better than the performance of PAQS. No serious capacity loss was observed in the following cycles. Although capacity decay is still present, the discharge capacity remained at 100.2 mAh/g after 100$^{th}$ cycle (82% capacity retention), which is drastically improved compared to the behavior of PAQS system (30% capacity retention). In contrast to this slow but continuing capacity loss of the 26PAQ battery cell, 14PAQ presents much better cycling stability. As shown in FIG. 3, Panels (b) and (d), at the same current rate of 0.5 C (130 mA/g), considerable capacity loss, from 132.7 mAh/g to 106.0 mAh/g, was only observed in the first 7 cycles, after which very little capacity loss was detected in at least 100 cycles. A discharge capacity of 104.9 mAh/g can be obtained in the $100^{th}$ cycle, which suggests only a 1% capacity loss after the $7^{th}$ cycle. In contrast to PAQS or 26PAQ, in addition to being superior in capacity retention, the Mg-14PAQ also shows a much smaller discharge-charge polarization and no significant electrochemical polarization increase was observed in at least 100 cycles.

Figure 4:
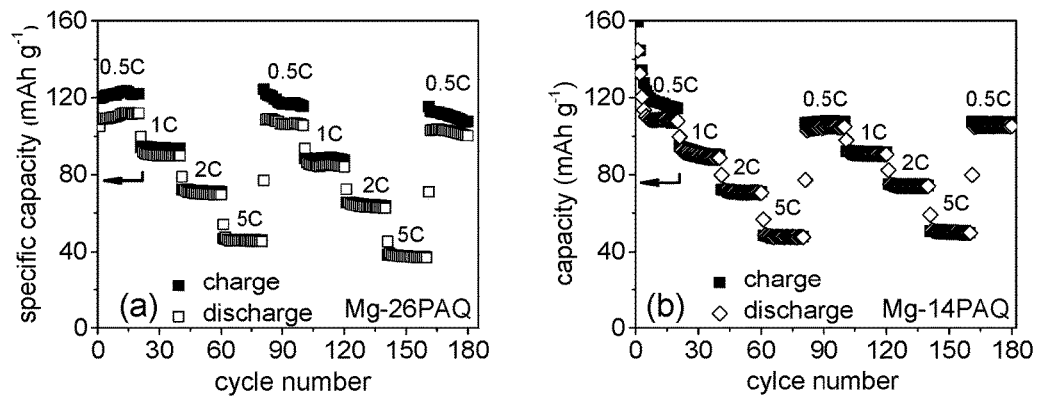
FIG. 4 shows stepwise rate capacity with increasing current rates: (a) Mg-26PAQ cell at the current rates of 0.5 C, 1.0 C, 2.0 C and 5.0 C; (b) Mg-14PAQ cell at the current rates of 0.5 C, 1.0 C, 2.0 C and 5.0 C.
Figure 5:
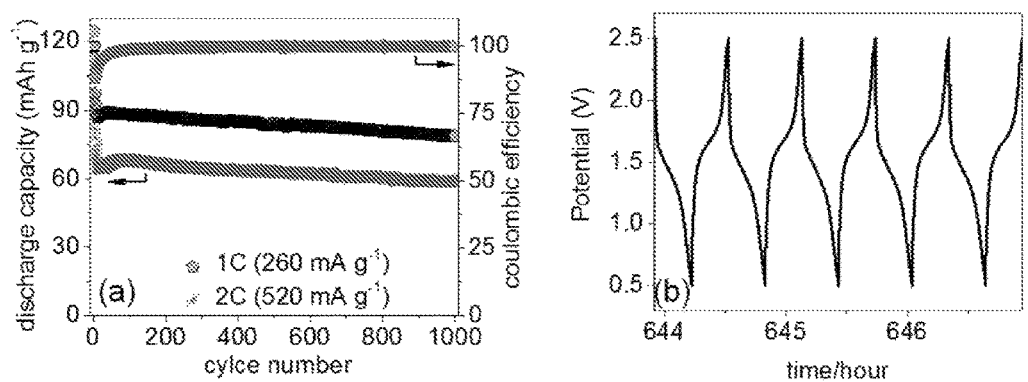
FIG. 5 shows Mg-14PAQ cycling performance: (a) 1000 cycles discharge capacity and coulombic efficiency for current rates at 1 C (260 mA/g), and 2 C (520 mA/g); (b) galvanostatic discharge-charge curves from 996th to 1000th cycles for current rate of 1 C (260 mA/g).

In addition to the excellent cycling performance at a 0.5 C rate, the rate performance of 14PAQ was then evaluated by the stepwise cycling experiment from 0.5 C (130 mAh/g) to 5.0 C (1300 mAh/g) (20 cycles for each current rate). As shown in FIG. 4, Panel (b), the demonstrated cycling stability further highlights the great potential of 14PAQ as high-rate and long-term cycling cathode material for rechargeable magnesium ion batteries. In agreement with the rate capacity performance, as shown in FIG. 5, at the elevated current rates of 1 C (260 mA/g) and 2 C (520 mA/g), the Mg-14PAQ cells were further proved to be capable of delivering more than 1000 cycles with very little capacity loss and high coulombic efficiency. For instance, at the current rate of 1 C (260 mAh/g), a similar capacity decay was detected only in the first 10 cycles from 110.1 mAh/g to 87.1 mAh/g. After the $10^{th}$ cycle, very little capacity loss was observed, and the discharge capacities of 83.7 mAh/g and 78.7 mAh/g were recovered in the $500^{th}$ and $1000^{th}$ cycles with above 99.7% coulombic efficiency. This suggests 96.1% and 90.4% capacity retention respectively after the $10^{th}$ cycle. Similar high performance was also seen at faster current rates such as 2 C and 5 C, although with decreased capacities.

The sustainable cycling performance of Mg-14PAQ battery was further highlighted by the excellent galvanostatic discharge-charge behavior after more than 600 hours continuous cycling, as shown in FIG. 5, Panel (b). Since both 26PAQ and 14PAQ have very limited solubility in the electrolyte solvent THF, the structure difference likely accounts for the superior cycling stability of 14PAQ. Compared to 26PAQ, the redox-active quinonyl moieties in 14PAQ lie on the side of the main polymer chain. Upon the discharging, the inserted $Mg^{2+}$ ion can be better stabilized by two adjacent quinonyl carbonyl groups via the chelating effect.

Figure 6:
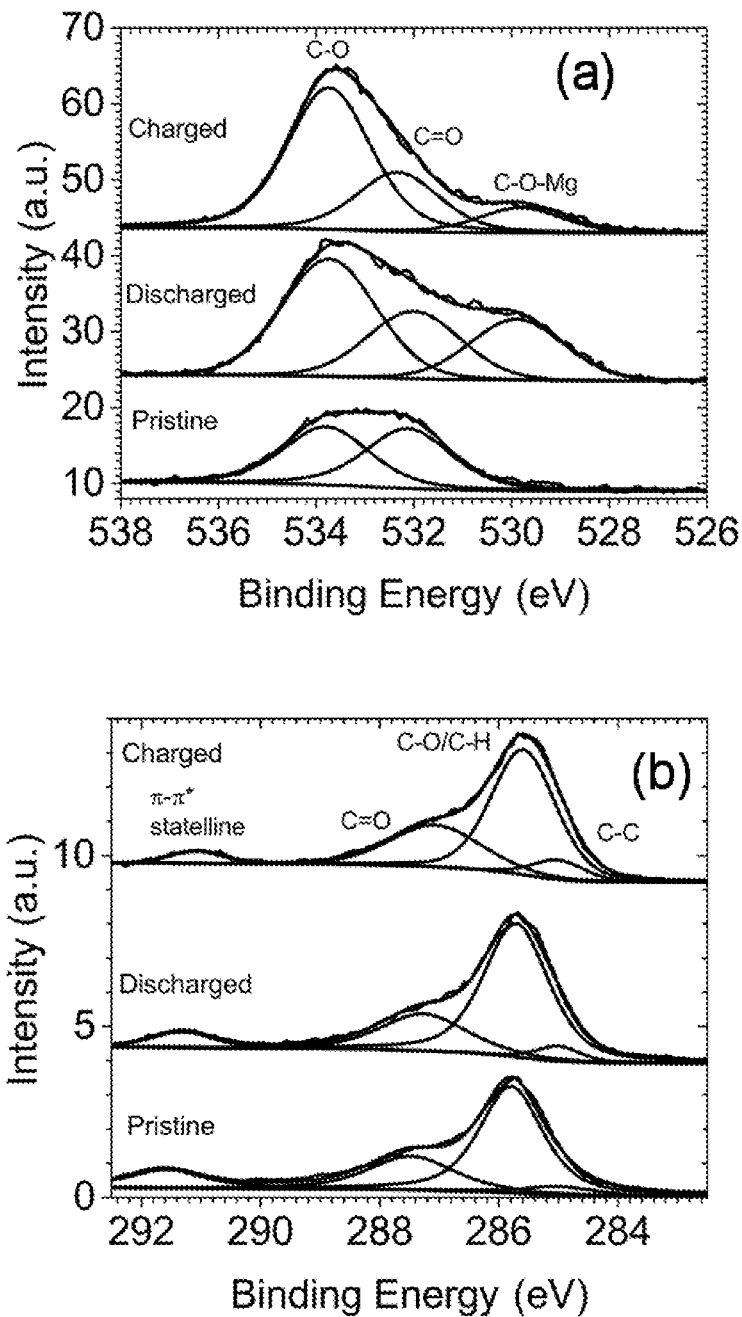
FIG. 6 shows X-ray photoelectron spectra of Mg-14PAQ (a) O$_{1s}$ spectrum; (b) C$_{1s}$ spectrum.

In order to gain in-depth redox understanding behind the excellent cycling performance of our Mg-14PAQ battery system, X-ray photoelectron spectroscopy (XPS) measurements were carried out to investigate the bonding and composition changes for the organic cathodes. FIG. 6, Panel (a) shows the $O_{1s}$ spectra comparison for the pristine, discharged, and charged states. Clearly, the pristine cathode has negligible C—O-metal (Mg) component (529.2 eV), while the discharged cathode shows significant C—O—Mg component, suggesting the interaction of magnesium ions with the C=O bind and the formation of the C—O—Mg structure. The subsequent charging process suppressed the C—O—Mg signal in the $O_{1s}$ spectrum, indicating the recovery of the oxidized 14PAQ from the reduced state. This formation of C—O—Mg results from the C=O bond breaking and forming C—O—Mg during discharge, and the decrease in the C—O—Mg peak indicates that upon charge, the C—O—Mg returns to C=O bond. The high-resolution $C_{1s}$ spectra in FIG. 6, Panel (b) also supports the C=O transformation to C—O—Mg during discharge. Since the carbon is the majority of 14PAQ laminate and the binding energy of C—O (285.5~286.5 eV) is overlapped with C—H in 14PAQ, the changes in C=O and C—O peaks in FIG. 6, Panel (b) are not easy to see due to overall strong carbon signal, but the quantitative ratio changes can be determined from XPS analysis (Table 1). Therefore, a likely redox mechanism involving the reversible C=O to C—O—Mg transformation (i.e., upon discharge the anthraquinone moieties undergo the reduction to generate hydroxyanthraquinone anions, along with the transformation of C=O double bonds to C—O single bonds) can be inferred from the XPS measurement.

TABLE 1

XPS determination of area ratio of C—O and C=O of pristine, charged (Mg-extracted) and discharged (Mg-inserted) 14PAQ laminates from $C_{1s}$ spectrum.

|  | C—O/CH | C=O |
|---|---|---|
| Pristine | 69.8% ± 0.9% | 30.2% ± 0.9% |
| Discharged | 73.3% ± 0.6% | 26.7% ± 0.6% |
| Charged | 68.1% ± 1.1% | 31.9% ± 1.1% |

Figure 7:
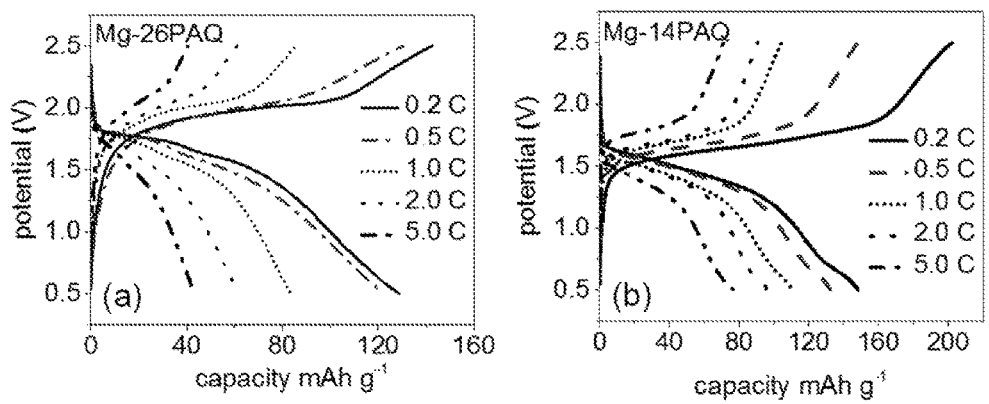
FIG. 7 shows initial discharge-charge profiles at current rates of 0.2 C, 0.5 C, 1.0 C, 2.0 C and 5.0 C with 0.3M Mg(HMDS)$_2$-4MgCl$_2$/THF as the electrolyte: (a) Mg-26PAQ cells; (b) Mg-14PAQ cells.
Figure 8:
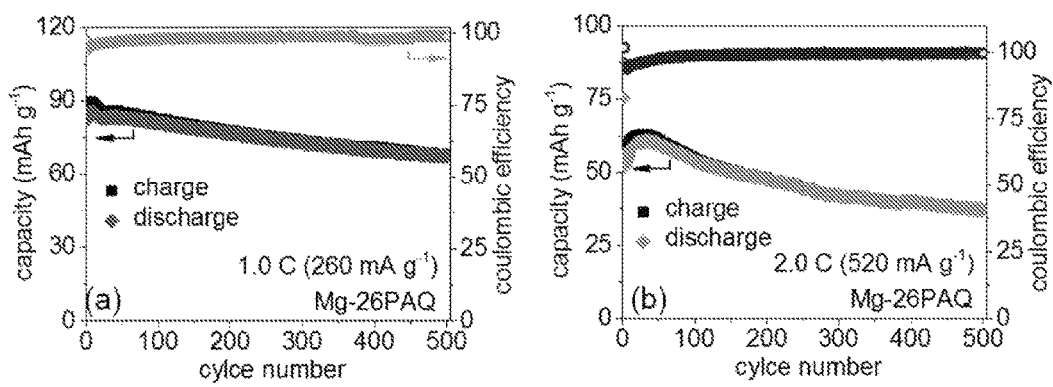
FIG. 8 shows cycling performance of Mg-26PAQ battery cells using 0.3M Mg(HMDS)$_2$-4MgCl$_2$/THF as the electrolyte in 500 cycles: (a) 1.0 C, 260 mA/g; (b) 2.0 C, 520 mA/g.

FIG. 7, Panel (a) shows initial discharge-charge profiles at current rates of 0.2 C, 0.5 C, 1.0 C, 2.0 C and 5.0 C with 0.3M $Mg(HMDS)_2$-$4MgCl_2$/THF as the electrolyte for the Mg-26PAQ cells. FIG. 7, Panel (b) shows initial discharge-charge profiles at current rates of 0.2 C, 0.5 C, 1.0 C, 2.0 C and 5.0 C with 0.3M $Mg(HMDS)_2$-$4MgCl_2$/THF as the electrolyte for the Mg-14PAQ cells. FIG. 8 shows cycling performance of Mg-26PAQ cells using 0.3M $Mg(HMDS)_2$-$4MgCl_2$/THF as the electrolyte for 500 cycles, at rates of (a) 1.0 C, 260 mA/g, and (b) 2.0 C, 520 mA/g.

Electrolyte salts useful for the electrochemical cells described herein include an non-nucleophilic Mg electrolyte, such as, for example, MACC ($MgCl_2$—$AlCl_3$), MHCC ($Mg(HMDS)_2$-$AlCl_3$) and MTCC ($Mg(TFSI)_2$-$MgCl_2$), where HMDS stands for hexamethyldisilazide, and TFSI stands for bis(trifluoromethanesulfonyl)imide. Other useful electrolyte salts include $Mg(BF_4)_2$, $Mg(ClO_4)_2$, magnesium dibutyldiphenylborate ($Mg(BPh_2Bu_2)_2$), magnesium tributylphenylborate ($Mg(BPhBu_3)_2$), magnesium chloride, and the like, as well as combinations of two or more such materials.

Suitable solvents for the electrolytes include, e.g., non-aqueous solvents such as ethers, nitriles, sulfones, and amino-substituted alkyl compounds, for example, tetrahydrofuran (THF), dimethoxyethane (glyme), bis(2-methoxyethyl) ether (diglyme), tetraglyme, long chain glyme compounds of formula $CH_3O(CH_2CH_2O)_nCH_3$ where n≥5 (e.g., 5 to 20), poly(ethylene oxide) polymers, 1,3-dioxolane, sulfolane, 1,3-diaminopropane, 3-methoxypropionitrile, acetonitrile, 2-methyltetrahydrofuran, 2,5-dimethyltetrahydrofuran, and combinations of two or more such solvents. Preferably the salt is present in the solvent at a concentration in the range of about 0.001 M to about 5 M, more preferably about 0.1 M to about 0.5 M.

The anode for the electrochemical cells can be, for example Mg metal, Al metal, silicon, and the like.

Cathodes comprising the electroactive polyanthraquinone can include other materials such as a particulate carbon material (e.g., carbon black, carbon nanotubes, carbon nanofibers, graphene, graphite, and the like, preferably as particles mixed with the polymer, and held together with a binder such as poly(vinylidene difluoride) (PVDF), styrene-butadiene rubber (SBR), and the like, as is well known in the battery arts. Preferably, the bound together mixture is coated onto a conductive current collector, e.g., a metal foil, a graphite foil, and the like.

The anthraquinonyl-based polymers described herein provide excellent electrochemical reversibility. The inherent capacity decay of PAQS suggests that PAQS is not capable of providing sustainable cycling performance in magnesium ion batteries. In contrast, the replacement of PAQS by 26PAQ successfully suppressed the capacity fading, and the Mg-26PAQ battery cell can deliver above 100 mAh/g discharge capacity in 100 cycles (82% capacity retention) at a reasonable rate of 0.5 C (130 mA/g).

In contrast to the slow, but still continuing, capacity fading of the Mg-26PAQ batteries, the Mg-14PAQ system shows the best cycling stability among the series. Considerable capacity loss was observed in the first few cycles for Mg-14PAQ battery cells, yet very little capacity loss was observed in the next hundreds of cycles. For instance, at the current rate 0.5 C (130 mA/g), 104.9 mAh/g discharge capacity can be obtained in the $100^{th}$ cycle, which suggests a 99% capacity retention after the $7^{th}$ cycle. This superior cycling stability and rate capacity of the Mg-14PAQ system was further highlighted by more than 1000 successful cyclings at elevated current rates with little capacity loss. In addition to being superior to other reported organic cathodes for rechargeable magnesium ion batteries, the Mg-14PAQ system also represents one of the very few magnesium-ion battery systems capable of providing stable and long-term cycling performance.

Compared to the state-of-the-art Chevrel $Mo_6S_8$ (below 1.3 V discharge voltage), Mg-14-PAQ can be operated at much higher working voltages (about 1.6 V discharge voltage at the current rate of 0.5 C), and is capable of delivering much higher capacities both theoretically and experimentally. The success of the Mg-14PAQ system further highlights the potential of magnesium ion batteries as the new generation energy storage devices, and will also benefit the continuing development of low cost and environmentally benign redox-active organic cathode materials with higher energy density for magnesium storage.

Procedures.
General Considerations

All synthesis and characterization was carried out in argon-filled glove boxes or argon-filled Schlenk line unless otherwise noted. Magnesium bis (hexamethyldisilazide) ($Mg(HMDS)_2$), magnesium chloride ($MgCl_2$, 99.99%), 2,3-Dichloro-5,6-dicyano-1,4-benzoquinone (DDQ), bis(pinacolato)diboron, $Pd(DPPF)Cl_2$ (DPPF=1,1'-bis(diphenylphosphino)ferrocene), N-methyl pyrrolidone were purchased from Sigma-Aldrich and used without further purification. 2,6-bromoanthraquinone and 1,5-dibromoanthraquinone were purchased from TCI America and used without further purification. Anhydrous tetrahydrofuran (THF) was purchased from Alfa Aesar and further dried with 3 Å molecular sieves for more than 24 hours before use.

Synthesis of the 0.3M $Mg(HMDS)_2$-$4MgCl_2$ in THF Electrolyte

To 5 mL 0.3 M $Mg(HMDS)_2$ (517 mg, 1.5 mmol) in THF solution was added 571.3 mg (6 mmol) anhydrous $MgCl_2$ salt. The mixture was allowed to stir at room temperature for more than 48 hours to afford colorless solution. Typical cyclic voltammogram (CV) measurements using platinum as the working electrode and freshly polished magnesium ribbons as reference and counter electrodes show the excellent reversible magnesium plating/stripping with a coulombic efficiency of 99.8% for this electrolyte.

Synthesis of 1,5-Poly(Anthraquinonylsulfide) (PAQS)

Under an argon-filled Schlenk line, 1.56 g (0.02 mol) anhydrous $Na_2S$ was suspended in 50 mL anhydrous N-methyl pyrrolidone, to which was added 5.54 g (0.02) 1,5-dibromoanthraquinone. The mixture was allowed to reflux at 205° C. under argon atmosphere for more than 12 hours in a sand bath. After completion in 12 hours, the mixture was cooled down to room temperature slowly. The product was collected via filtration, and washed with hot water 15 mL three times, and then acetone 15 mL three times. The resulting orange power was dried in a vacuum oven at 125° C. for more than 12 hours affording the final product of 4.1 g, 86% yield.

Synthesis of 2,6-polyanthraquinone (26PAQ)

To an argon filled 100 mL Schlenk flask, 300 mg (0.82 mmol) 2,5-dibromoanthraquinone, 208 mg (0.82 mmol) bis(pinacolato)diboron, and 35 mg (0.05 mmol) $Pd(DPPF)Cl_2$ were loaded and suspended in 25 mL toluene. Under argon atmosphere in a Schlenk line, 6 mL potassium carbonate solution (0.5 M) was added. The mixture was sealed and then was stirred at 130° C. in a sand bath. After the completion of the reaction in 3 days, the mixture was cooled down to room temperature, and then poured into 200 mL dichloromethane in the fume hood. The precipitated solid was collected via filtration, and further washed with water, methanol, chloroform and toluene. Further drying in a vacuum oven at 100° C. for 10 hours afford dark green powder of 155 mg. FT-IR spectroscopy measurement suggests the presence of some reduced 26PAQ product as polyhydroxylanthraquinone by the observation of strong and broad O—H stretching at around 3418 $cm^{-1}$, and the observation of typical C—O single bond stretching at 1196 $cm^{-1}$ and 1143 $cm^{-1}$ (blue colored spectrum in Figure S3). Thus, the obtained 155 mg dark green powder was further oxidized by one equivalent of 2,3-dichloro-5,6-dicyano-1,4-benzoquinone (DDQ) in THF for 12 hours. After completion, the product was collected via filtration and washed with 5 mL anhydrous THF three times, affording 150 mg brown color product with the overall yield of 91%. FT-IR suggests the fully oxidized 26 PAQ as the final product.

Synthesis of 1,4-polyanthraquinone (14PAQ)

The precursor 1,4-dichloroanthraquinone was synthesized as follows: Bis(1,5-cyclooctadiene)nickel(0) $(Ni(COD)2$, 2.2 g, 8 mmol), 2,2'-bipyridine (1.25 g, 8 mmol), and 1,5-cyclooctadiene (COD, 0.74 mL, 6 mmol) were first dissolved in 60 mL dimethyl formamide (DMF). 1,4-dichloroanthraquinone was then dissolved in 40 mL DMF and added into the above solution. The mixture reacted at 60° C. for 48 h under nitrogen flow. After cooling to room temperature, the mixture was poured into 100 mL diluted hydrochloric acid (0.5 M), immediately generating yellow precipitate. The product was filtered and washed several times successively with DMF, diluted hydrochloric acid, warm deionized water, and methanol, then dried at 80° C. in a vacuum for 12 h. To purify 14PAQ, as-prepared product was dissolved in chloroform and recrystallized by adding methanol. The final yield of 14PAQ is around 85%.

Cathode Laminate Preparation

The laminates were prepared by mixing the active organic polymer material, TIMCAL SUPER C45 carbon black and poly(vinylidene difluoride) binder with the weight ratio of 4:5:1 by N-methyl-2-pyrrolidone (NMP), and the resulting slurry was coated onto GRAFTECH GRAFOIL graphite foil. The laminates were dried in a 75° C. oven for two hours before they were cut to electrodes with a diameter of 7/16 inches. The electrode laminates were then dried in vacuum at 120° C. for more than 12 hours before use. Each laminate contained around 1.0-1.5 mg of active material.

Electrochemical Measurements

Cyclic voltammogram measurement was carried out using a Princeton Instrument's PARSTAT MC potentiostat, and three consecutive cycles were performance for each experiment. The cell cycling performance was carried out using the 2032-type coin cells on a MACCOR series 4000 cycler with the cutoff at 0.5 V and 2.5 V at room temperature with a Mg anode using the 0.3M $Mg(HMDS)_2$-$4MgCl_2$ in THF electrolyte.

X-Ray Photoelectrospectroscopy

The XPS spectra were collected at the Keck II facility of NUANCE at Northwestern University with an Omicron ESCA probe using monochromated Al Kα X-rays. A low-energy electron flood gun was used to compensate the XPS induced surface charging effects. The carbon is line (284.8 eV) was used as the reference to calibrate the XPS spectra.

Exemplary Electrochemical Cell and Battery.

Figure 9:
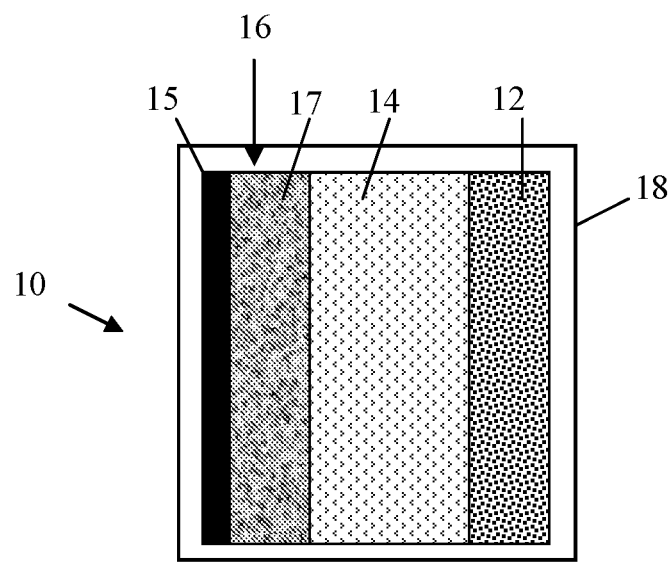
FIG. 9 schematically illustrates an electrochemical cell.
Figure 10:
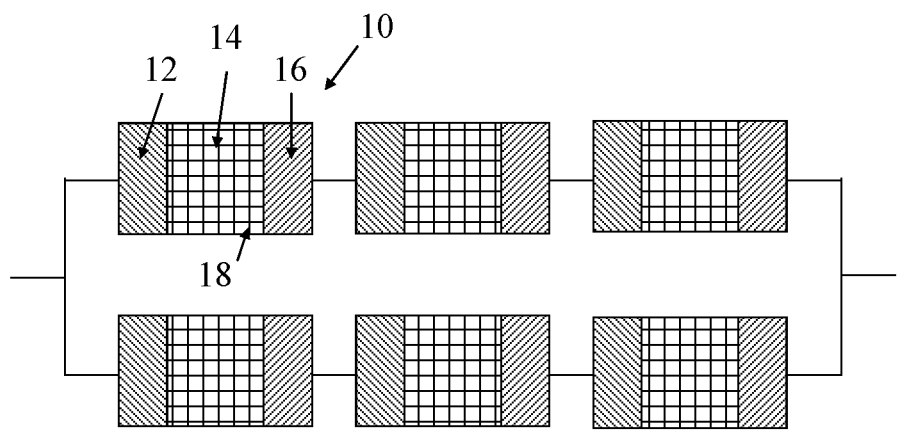
FIG. 10 schematically illustrates a battery comprising a plurality of an electrochemical cells electrically connected together.

A schematic illustration of a magnesium electrochemical cell 10 is shown in FIG. 9. Cell 10 comprises anode 12 separated from cathode 16 by a separator 14 saturated with the electrolyte, all contained in insulating housing 18 with suitable terminals (not shown) being provided in electronic contact with anode 12 and cathode 16 of the invention. Cathode 16 comprises graphite collector 15 and active layer 17 comprising a polyanthraquinone polymer as described herein. FIG. 10 provides a schematic illustration of one example of a battery in which two strings of electrochemical cells 10, described above, are arranged in parallel, each string comprising three cells 10 arranged in series.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiment of the invention in which an exclusive property or privilege is claimed are defined as follow:

1. A rechargeable magnesium ion electrochemical cell comprising:
   an anode;
   a cathode;
   and a magnesium ion-containing electrolyte disposed between the anode and the cathode;
   wherein the cathode comprises a redox-active anthraquinone polymer selected from the group consisting of 1,4-polyanthraquinone, 2,6-polyanthraquinone, and a combination thereof.

2. The electrochemical cell of claim 1, wherein the anthraquinone polymer comprises 1,4-polyanthraquinone.

3. The electrochemical cell of claim 1, wherein the anthraquinone polymer comprises 2,6-polyanthraquinone.

4. The electrochemical cell of claim 1, wherein the cathode further comprises a particulate carbon material in addition to the anthraquinone polymer.

5. The electrochemical cell of claim 4, wherein the particulate carbon material comprises carbon black.

6. The electrochemical cell of claim 4, wherein the cathode further comprises a binder to bind the carbon and polymer together.

7. The electrochemical cell of claim 6, wherein the binder is poly(vinylidene difluoride).

8. The electrochemical cell of claim 1, wherein the cathode further comprises a conductive substrate in contact with the anthraquinone polymer.

9. The electrochemical cell of claim 1, wherein the electrolyte comprises a non-nucleophilic magnesium salt in a non-aqueous solvent.

10. The electrochemical cell of claim 1, wherein the electrolyte comprises a magnesium salt selected from $MgCl_2$—$AlCl_3$, $Mg(HMDS)_2$-$AlCl_3$, $Mg(HMDS)_2$-$4MgCl_2$, and $Mg(TFSI)_2$-$MgCl_2$, wherein HMDS is hexamethyldisilazide, and TFSI is bis(trifluoromethanesulfonyl) imide.

11. The electrochemical cell of claim 1, wherein the electrolyte comprises $Mg(HMDS)_2$-$4MgCl_2$ in tetrahydrofuran.

12. The electrochemical cell of claim 1, wherein the cell maintains at least 80% discharge capacity after 100 cycles at a current rate of about 0.5 C (130 mA $g^{-1}$).

13. The electrochemical cell of claim 1, wherein the cell maintains at least 90% discharge capacity after 1000 cycles at a current rate of about 1 C (260 mA g$^{-1}$).

14. The electrochemical cell of claim 1, wherein the cathode comprises:
   a mixture of the redox-active anthraquinone polymer and a particulate carbon material held together by a binder and coated on a conductive substrate.

15. The electrochemical cell of claim 14, wherein the binder is poly(vinylidene difluoride).

16. The electrochemical cell of claim 15, wherein the particulate carbon material comprises carbon black.

17. The electrochemical cell of claim 14, wherein the conductive substrate comprises graphite foil.

18. The electrochemical cell of claim 16, wherein the anthraquinone polymer, carbon black, and binder are present in a weight ratio of about 4:5:1, respectively.

19. A battery comprising a plurality of the electrochemical cell of claim 1 electrically connected together.

* * * * *